May 28, 1935.  H. P. DONLE  2,002,992
TELEVISION METHOD AND APPARATUS
Filed April 1, 1932  2 Sheets-Sheet 1
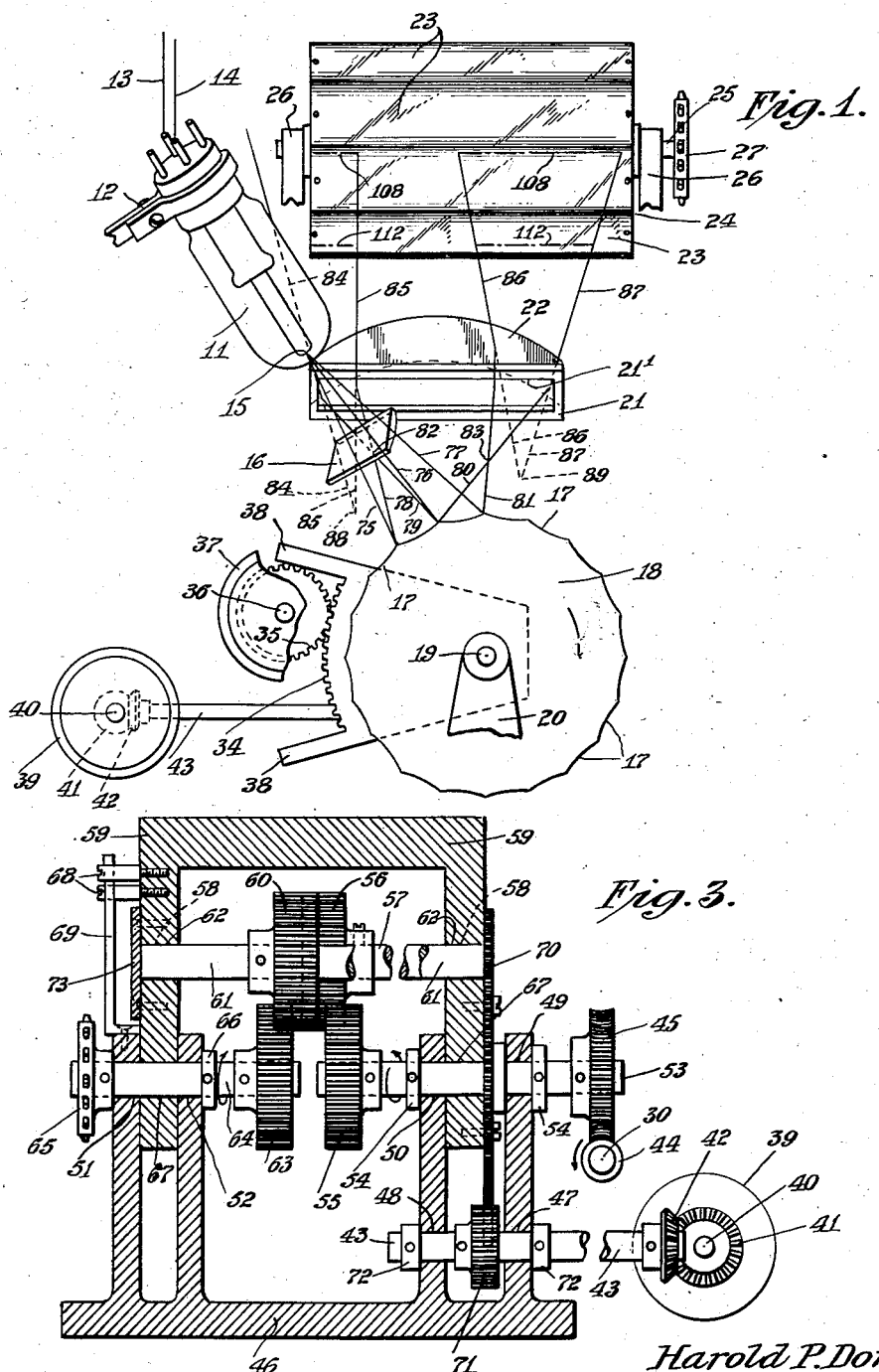
Harold P. Donle
INVENTOR
BY
ATTORNEY

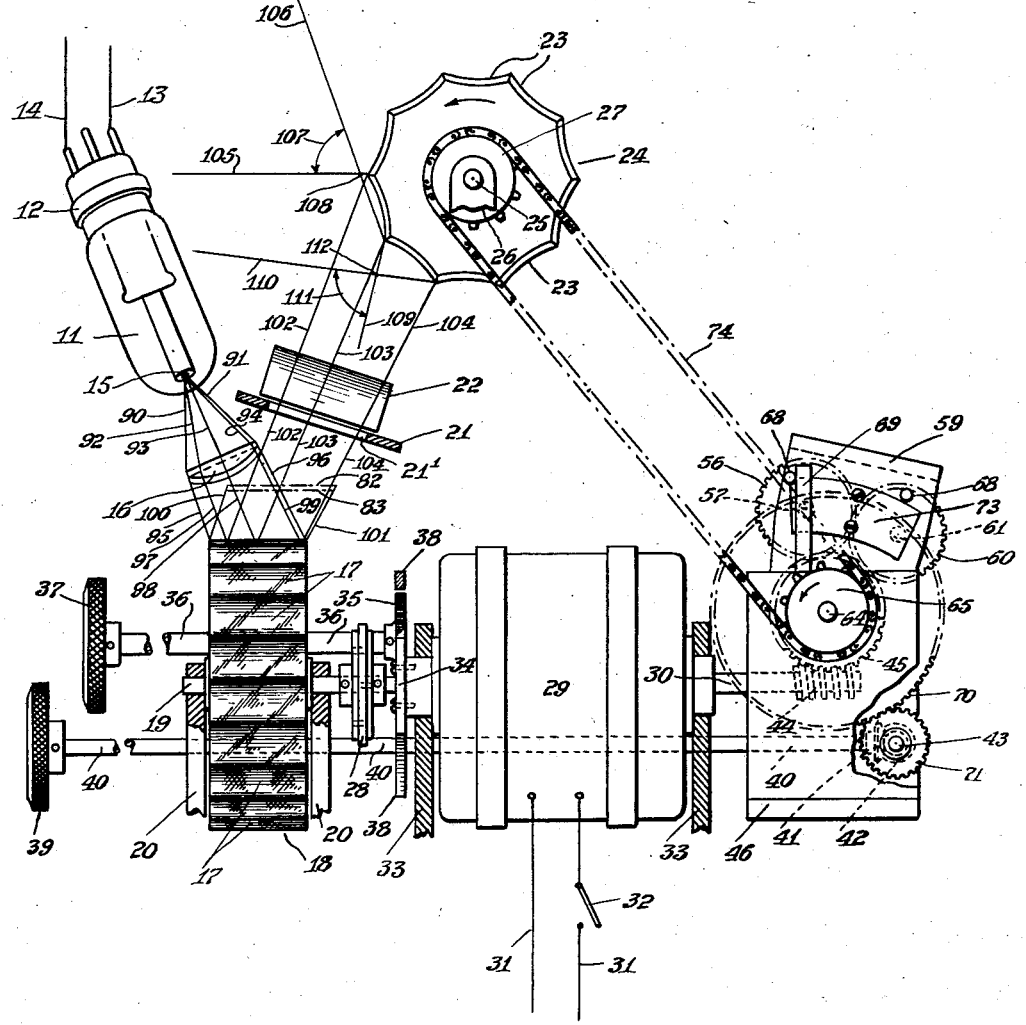

Patented May 28, 1935

2,002,992

UNITED STATES PATENT OFFICE 2,002,992

TELEVISION METHOD AND APPARATUS

Harold P. Donle, Meriden, Conn., assignor to Radio Inventions, Inc., New York, N. Y., a corporation of New York Application April 1, 1932, Serial No. 602,539

9 Claims. (Cl. 178—6)

The present invention is an apparatus for the transmission and reception of visual images such as television images.

Several methods and types of apparatus have been used to accomplish reception of television images, but many have had a general disadvantage in that the resulting image possessed a low degree of brilliance, necessitating a darkened or semi-darkened room for viewing. The method and apparatus of the present invention provides an image of a brilliance much greater than common through the use of a concentrated light source and of cylindrical concave optical reflecting elements as explained later in this specification.

Most present apparatus in which concentrated light sources are used require that the light source be quite small, i. e., usually in the order of 1/50 inch in diameter, and that requirement has reduced the total light which might be obtained from the source. The method and apparatus of my invention, on the other hand permit the use of a comparatively large light source, i. e., in the order of $\frac{1}{16}$ inch in diameter, which allows a relatively great amount of light to be obtained from the source. My experience indicates that there is a maximum or limiting brilliance (i. e., light per unit area) which may be obtained in a concentrated-source lamp such as one of the ionized neon type, so that it is desirable to use a light-area consistent with that maximum brilliance and with the amount of energy available for operating the lamp.

The lamp or light source used in the apparatus of my invention fulfills this requirement very closely. Since the illumination obtained from a light source is substantially proportional to the area of the source i. e., the square of its diameter, the light source of my apparatus delivers approximately 25 times as much light as do the lamps used in most other apparatus.

Further, in the apparatus of this invention, the adjustments of focus or placing of the optical elements is relatively simple and is not critical.

A disadvantage of many present types of scanners is that the field of view is not uniformly illuminated, i. e., the corners or boundaries of the image field are of considerably lower brilliance than is the center of the image field. In the apparatus of my invention this defect is entirely overcome, and substantially uniform illumination is an inherent characteristic of my novel method of scanning.

Another advantage of the apparatus of my invention is that the size of the apparatus is relatively small, when compared with present types of directly viewed scanners providing the same size of image as does my apparatus.

My invention will be more fully understood by reference to the drawings forming part of this specification.

Fig. 1 is a front elevation of apparatus illustrating my invention.

Fig. 2 is a left-side elevation of the same apparatus as shown in Fig. 1.

Fig. 3 is a detail view partially in section of the means for accomplishing vertical framing, as shown in Figs. 1 and 2.

Referring now to Fig. 1, a lamp or light source 11 is shown rigidly supported in a proper position by clamp 12. The light source should be preferably of a concentrated spot type and capable of being modulated in brilliance according to the magnitude of electric current flowing therethrough. The current may be supplied from any suitable source of picture signal, such as a television receiver, and conducted to the lamp through leads 13 and 14. The lamp 11 may emit light from crater 15.

The horizontal scanner includes a plurality of concave cylindrical mirrors 17 which may be attached by any convenient means to a drum 18 placed in the path of the light from source 15 and fixed on a shaft 19 carried in bearings 20.

These mirrors may be constructed of "silvered" glass, polished metal sheet, or other suitable material, or may be electroplated and polished on the machined surfaces of drum 18. In Figures 1 and 2, the mirrors are assumed to be metallic with light rays reflected from their exposed surfaces. The reflecting surfaces may be positioned upon the drum 18 as shown, with the physical center of each mirror aligned with its axis of curvature and with the axis of the drum 18, or the physical center of each mirror may be displaced by a desired distance from the plane joining the axis of curvature of the mirror and the axis of the drum 18. The latter construction may be used alternatively for the sake of slightly modifying the scanning action or of avoiding interference between the various optical elements of my apparatus and the various light rays which proceed therethrough, in case such interference occurs in any modified construction of this apparatus. Alternatively the drum 18 may be shaped as a truncated cone, and mirrors 17 placed thereabout so that the axis of curvature of any mirror is contained in a common plane together with the axis of drum 18 but is not parallel thereto.

The vertical scanner indicates a plurality of concave cylindrical mirrors 23 shown attached to a drum 24 properly placed in the path of light reflected from mirrors 17 and fixed on a rotatable shaft 25 carried in bearings 26. The types of construction of drum 24 and mirrors 23 may be substantially the same as those related in the description of drum 18 and mirrors 17, except that the axial length of drum 24 is preferably greater than the length of drum 18.

The convex cylindrical lens 16 may be supported in a suitable position between lamp 11 and mirrors 17, in such manner that the axis of curvature of the convex surface of lens 16 (i. e., the central line about which the surface is generated) is substantially perpendicular to the axes of curvature of mirrors 17.

The convex cylindrical lens 22 may be supported in a suitable position in the path of light from mirrors 17 to mirrors 23 in such a manner that the axis of curvature of the convex surface of lens 22 is substantially perpendicular to the centers of curvature of mirrors 23. The cross-sectional area of the light path through the lens may be delimited by a mask 21 attached to or near the lens and provided with a substantially rectangular opening 21'.

The mirror drum 18 is driven by an electric motor 29 preferably of the synchronous type with current supplied from power lines 31 through switch 32, and with its shaft 30 coupled to the shaft 19 of drum 18 through a flexible coupling 28 such as a leather-disc coupling. Motor 29 may be mounted in bearings 33 at either end.

A segment sector of a spur gear 34 may be fixed to the motor and mesh with a spur gear 35 on shaft 36 which carries at its forward end an adjusting knob 37 by which spur gear 35 may be rotated manually. This action may be limited by stops 38 at the upper and lower extremities of the spur gear sector 34, shown in Fig. 1.

Thus the frame and field of motor 29 may be rotated over a suitable range, by this means rotating the drum 18 for the purpose of horizontal framing of the image when the apparatus is in operation.

The mirror drum 24 is also driven by the same motor. A rear extension of motor shaft 30 has a worm 44 fixed thereto and meshed with a worm gear 45 which may be mechanically connected through a gear train for vertical framing. Sprocket 65 on shaft 64 is connected by means of a chain 74 to a sprocket 27 fixed on the shaft 25 of drum 24.

Referring to Fig. 3 a casting 46 is shown with bearings, 47, 48, 49, 50, 51 and 52 arranged therein. Worm gear 45 is shown fixed on shaft 53 which may be rotatably carried in bearings 49 and 50, and prevented from longitudinal motion by collars 54 placed at either side of the bearings 49 and 50. On the other extremity of shaft 53 may be fixed a spur gear 55 engaging a spur gear 56 fixed on a countershaft 57, which countershaft may be rotatably carried in bearings 58 arranged at either end of a carriage 59. Spur gear 56 may engage a spur gear 60 fixed on countershaft 61, which countershaft may be rotatably mounted in bearings 62 in carriage 59. Countershafts 57 and 61 may be restrained from longitudinal motion by a cover plate 73 at one end of the carriage 59 and a portion of the flat side of a spur gear 70 at the other end.

Spur gear 60 may engage a spur gear 63 fixed on shaft 64, whose axis may coincide with the axis of shaft 53, and shaft 64 is rotatably carried in bearings 51 and 52. A sprocket 65 on shaft 64 and a collar 66 prevent longitudinal motion of shaft 64.

Carriage 59 may be rotatably carried upon coincident shafts 53 and 64 by means of bearings 67 arranged in the carriage, and the rotation of the carriage may be delimited by means of two stop pins 68 fixed therein on opposite sides of stationary arm 69. A spur gear 70 fixed to the end of carriage 59, concentric with shaft 53 engages a spur gear 71 fixed to shaft 43 which may be carried rotatably on bearings 47 and 48 with collars 72 at either side of the bearings. Shaft 43 has fixed on the opposite end a bevel gear 42 engaging a bevel gear 41 which latter is fixed on control shaft 40 (carried in bearings not shown).

At the other end of control shaft 40, which may be brought out at the front of the complete apparatus, an adjusting knob 39 may be fixed, to be rotated manually for the purpose of rotating carriage 59. When shaft 40 is rotated the resulting rotation of carriage 59 and the planetary gears 56 and 60 causes a relative rotation between spur gears 55 and 63, i. e., between motor shaft 30 and sprocket 65. When the carriage 59 is stationary, the direction of rotation of spur gear 63 is opposite to that of spur gear 55.

It is evident that when knob 39 is rotated and the angular position of sprocket 65 is shifted, the angular position of drum 24 is also shifted, resulting in a vertical framing action controlled by the rotation of knob 39.

In the operation of the apparatus of my invention, the number of pictures scanned per second is equal to the number of mirrors 23 on drum 24 which pass across the field of view in a second. The number of scanning lines per picture is equal to the number of mirrors 17 on drum 18 which pass during the passage of a single mirror 23 on drum 24, i. e., during the scanning of a complete picture. The angular speed of drum 18 is preferably greater than the angular speed of drum 24, so that I shall hereinafter designate them as the fast drum and slow drum, respectively. The fast drum is shown with 20 mirrors and the slow drum with 10 mirrors, so that for scanning 60 lines per picture and 20 pictures per second, the fast drum should revolve 60 R. P. S. (3600 R. P. M.) and the slow drum should revolve 2 R. P. S. (120 R. P. M.) i. e. in angular speed ratio of 30:1. Thus the motor 29 revolves at 3600 R. P. M., and the gear train from motor shaft 30 to slow drum 24 is arranged for a 30:1 angular speed reduction.

As an example of the construction of the apparatus of my invention, a description of the approximate dimensions of the apparatus shown in Figs. 1 and 2 will be given. The fast drum 18 shown is 4.2 inches in diameter and 1.5 inches long, while the mirrors 17 thereon have a radius of curvature of 1.9 inches. The slow drum 24 shown is 2.95 inches in diameter and 5.0 inches long, while the mirrors 23 thereon have a radius of curvature of 1.25 inches. The axis of slow drum 24 is 7.75 inches above the axis of fast drum 18 and is 3.4 inches behind the vertical central plane of the fast drum. The equivalent focal length of the convex cylindrical lens 16 is 2.0 inches, while the equivalent focal length of the convex cylindrical lens 22 is 4.0 inches. The spot source 15 is approximately 3.0 inches from active mirrors 17, and the position of the lenses 16 and 22 may be easily determined from the drawings.

The horizontal characteristics of the scanned image may be largely dependent upon the proportions of mirrors 17, drum 18, and convex cylindrical lens 22, as seen in Fig. 1 while the vertical characteristic of the scanned image may be largely dependent upon the proportions of mirrors 23, drum 24, and convex cylindrical lens 16, as shown in Fig. 2. Both the horizontal and vertical characteristics of the scanned image are, however, dependent to a relatively smaller degree upon the position and size of light source spot 15, and the position of drum 24 with respect to drum 18, as well as the position of the observer, as will be evident from Figs. 1 and 2.

To become familiar with the optical paths in the apparatus of my invention it is desirable to refer to Figs. 1 and 2. As shown in the plane of Fig. 1, the spot of light 15 in lamp 11 is projected approximately uniformly over mirrors 17 without experiencing any appreciable deflection by lens 16. Two active mirrors 17 are shown reflecting the incident light to focus in two lines of light 82 and 83 parallel to the axes of curvature of the mirrors, i. e., perpendicular to the plane of the paper in Fig. 1. The boundary rays 78, 79, 80 and 81 of the light so reflected are shown, and continue their course after passing through foci 82 and 83, to impinge upon cylindrical convex lens 22 which acts upon the rays in the plane of Fig. 1. After passing through lens 22 the light continues as if coming from image lines of light 88 and 89 substantially parallel to real lines of light 82 and 83, and falls upon two active mirrors 23. The mirrors 23 act as plane mirrors in the horizontal direction, so that in Fig. 1 the light is reflected from mirrors 23 as if from plane mirrors, to the eye of the observer.

As shown in the plane of Fig. 2, the light from the source spot 15 is projected upon mirrors 17 through convex cylindrical lens 16 so that in the passage of light through the lens the rays become more nearly parallel i. e., the rays appear to come from a virtual image of the source spot 15 at a greater distance than is spot 15.

However, the action of lens 16 should not be so great as to cause a real image of spot 15 to be formed between lens 16 and mirrors 17. The light striking mirrors 17 is reflected (in the plane of Fig. 2) as if these were plane mirrors, and the rays proceed through lens 22 without any substantial deflection, falling upon the two active mirrors 23. The boundary rays 102, 103 and 104 of light striking the two active mirrors 23 are shown, as are the resulting boundary rays 105, 106, 109 and 110 of the light after reflection from mirrors. It is evident that the reflected light is focused by active mirrors 23 to two lines of light 108 and 112 which are parallel to the axes of curvature of the mirrors (i. e., perpendicular to the plane of the paper in Fig. 2). Light rays with boundary angles 107, and 111 proceed from the focal lines 108 and 112 into the viewing area or observer's area.

Since the pupil of the observer's eye is of limited extent, the light beam entering thereto is likewise of small area, i. e., the observer's eye receives only the light reflected from a definite small spot of point of an active mirror 23, and he apparently sees a spot of light upon the mirror at that point which apparent spot is effectively an optical intersection of focal lines such as 108 and 89. When drums 18 and 24 are stationary and in the positions shown in Figs. 1 and 2 an observer properly situated will perceive four such spots of light arranged substantially on the four corners of a rectangle.

If now the drum 18 is rotated, the spots of light appear to move horizontally in the direction of movement of active mirrors 17, or if the drum 24 is rotated the light spots appear to move vertically in the direction of movement of active mirrors 23, because the light entering the eye of the observer comes from successive points of the mirrors as either drum is rotated. The apparent area of a complete scanned image is the area bounded by the four apparent light spots, and such an area is approximately delimited by the mask 21, so that when a spot moves outside the image area delimited by mask 21 it is not visible to the observer. It is preferable that the aperture 21' of mask 21 be large enough to allow slightly more than one complete image to be seen, so that observers in various positions shall each be able to see a complete image. When the apparatus is in operation and the picture is correctly framed a complete scanned image appears, such correct framing being accomplished by rotating shaft 40 to move the image vertically and rotating shaft 36 to move the image horizontally.

It is evident in Fig. 2 that the vertical angle of view is substantially equal to the angle between boundary rays 105 and 110. The definition of vertical viewing angle is "the vertical angle at the scanner through which the observer may move while viewing the entire image".

The definition of horizontal viewing angle is similar, except that it is with respect to a movement of the observer through a horizontal angle. It is evident from Fig. 1 that the horizontal viewing angle is substantially equal to the angle between boundary rays 85 and 86, provided that drum 24 is of sufficient length to accommodate the observer's line of vision to each side of the image.

The lenses 16 and 22 are not absolutely essential to the operation of the apparatus of my invention, but their use increases the angle of view and the apparent brilliance of the image, when considering any given size of image. Either or both lenses may be omitted or reduced in power at a sacrifice of any one or more of the three factors of picture size, viewing angle, and brilliance, in the dimension affected by the lens omitted or weakened.

In Fig. 1 the width of the image is equal to the distance "D" between the virtual images 88 and 89 of light lines 82 and 83. However, when viewed by the observer, the images 88 and 89 are apparently moved to a position slightly in front of active mirrors 23 i. e., apparently closer to the observer than are images 88 and 89, so that they appear closer together in the ratio of $L/(L+Y)$, where "L" is the distance from the observer to mirror 23 and "Y" is the distance from mirror 23 to images 88 and 89. Finally the apparent width of the image is substantially equal to $DL/(L+Y)$. The apparent height of the image (in Fig. 2) is substantially equal to the vertical distance between image lines 108 and 112.

From Fig. 1 it is evident that the apparent width of the final image spot as viewed by an observer is substantially equal to the product of (1) the width of the source spot 15, (2) the magnification by the concave mirrors 17 (which is preferably less than unity) (3) the magnification by lens 22 (which is greater than unity) and (4) the ratio of $L/(L+Z)$, where "L" is the distance from the observer to the active mirrors 23 and "Z" is the distance from the active mirrors 23 to the source spot 15 via the optical path followed by the active rays. In Fig. 2 it is evident that the apparent height of the final image spot is substantially equal to the product of (1) the height of the source spot 15, (2) the magnification by the convex cylindrical lens 16 (which is greater than unity) (3) the magnification by the mirror 23 (which is preferably much less than unity), and (4) the ratio $L/L+X$ where "L" is the distance from the observer to the active mirror 23 and "X" is the distance from the active mirror 23 to the virtual image of source spot 15 (as formed by lens 16) via the optical path followed by the active light rays.

Thus in the apparatus illustrated in Figs. 1 and 2, in which the apparent image size is 1½ inches high by 1⅞ inches wide, the source size should be ⅛ inch high by 1/13 inch wide (or approximately the area of a circle 1/10 inch in diameter) to allow an overlap of 50% in adjacent scanning lines, i. e., to provide an apparent image spot .0375 inch square.

It is apparent therefore, that the size of the light source spot is considerably greater than the size of the apparent image spot. A small auxiliary lens of spherical or cylindrical construction may of course be placed close in front of light source spot 15 to alter the effective shape and size of the spot to any reasonable value, if so desired.

Since there are in the apparatus no apertures for delimiting an elementary image area, and no diffusing screens, the optical efficiency is very much higher than in a scanner in which these elements are used. The effect in the apparatus of my invention is that the observer is seeing the light source almost directly, with only an efficient lens and mirror interposed.

Another advantage of the apparatus of my invention is that the mirrors and lenses are operated at a low magnification, so that optical distortion is negligible, i. e., straight lines in the subject appear as straight lines in the image, even when low grade lenses and mirrors are used.

Another advantage of my invention is that the picture is not projected as a rear image upon a viewing screen, in which the aberration from the entire surfaces of the optical elements would be apparent, but the picture is viewed directly and the observer's eye receives light from only a very small area of the surface of any optical element, so that the apparent aberration is reduced to a negligible value.

Another advantage of my invention is that no external picture delimiting mask is necessary because the mask between the slow drum and the fast drum completely delimits the picture.

Other modifications of the apparatus disclosed herein will be apparent to those skilled in the art, but do not affect the novelty of my invention. For instance, a lens may be positioned between the active mirrors on the slow drum and the observer, for the purpose of magnifying the picture or altering the apparent ratio of its width to its height. Other framing means than that shown may be used, such as a series rheostat and switch in the power supply line to the electric motor or slipping clutch mechanisms in the mechanical drive system.

The apparatus of Figs. 1 and 2 may be used for scanning a real subject for transmission as a visual image, by substituting in place of the spot source 15 (in Figs. 1 and 2) a photo-sensitive device with appropriate light-admitting aperture. If, in this case, the aberrations of the optical elements become of considerable extent, suitably corrected optical elements may be used.

The slow drum with concave cylindrical mirrors as described herein may be used in conjunction with other types of scanners, such as those described in my co-pending applications, Serial Numbers 557,011 and 558,486, the latter now matured as Patent Number 1,961,962, by substituting the slow drum of the present invention for the slow drum of the existing types of scanners. In the case of the apparatus disclosed in my co-pending application, Ser. No. 557,011, the ground glass screen shown therein should be removed when this substitution is made.

An advantage of the substitution in many cases is a resulting reduction in the size of the apparatus needed relative to the size of the picture produced thereby.

I claim:

1. In an apparatus for scanning a visual image, a concentrated light source capable of modulation, a line scanning device comprising a rotatable element carrying fixed thereon a plurality of concave cylindrical reflectors whose axes of curvature are contained in planes common to their axis of rotation, and a field scanning device comprising a rotatable element carrying fixed thereon a plurality of concave cylindrical reflectors whose axes of curvature are contained in planes common to their axis of rotation, said light source and rotatable elements being arranged to form a scanned image suitable for direct viewing by the eye of an observer.

2. In an apparatus for scanning a visual image, a concentrated light source and two rotatable drums scanning in two different directions whose axes are substantially mutually perpendicular, each of said rotatable drums bearing upon its cylindrical surface a plurality of concave cylindrical reflectors whose radii of curvature produces a directly viewable image, said reflectors having their major axes parallel to the rotational axis of their respective supporting drums.

3. In an apparatus for scanning a visual image, a concentrated light source, two rotatable drums whose axes are substantially mutually perpendicular, each of said rotatable drums bearing upon its cylindrical surface a plurality of concave cylindrical reflectors, a convex cylindrical lens interposed between the light source and the first mirror drum, the axis of curvature of said convex lens being substantially perpendicular to the axis of said first drum, and a second convex cylindrical lens interposed between the first and second drums, the axis of curvature of said second lens being substantially perpendicular to the axis of said second drum so as to increase the angle of direct viewing of the reproduced image.

4. Television scanning apparatus comprising a spot source of light variable in intensity with the received picture signal, a rotating drum having concave reflecting surfaces receiving light from the spot source for scanning in one direction and a second drum having an axis at an angle to the first drum and having concave reflecting surfaces for scanning in a direction at an angle to the direction of the first scanning, the radii of curvature of said reflecting surfaces being such as to produce an image for direct viewing throughout a substantially wide angle of vision and said concave reflecting surfaces having their major axes parallel to the rotational axes of their respective supporting drums.

5. Television scanning apparatus comprising a light source and two drums for scanning in two different directions arranged with their axes substantially at right angles to each other, each drum having a series of concave reflecting surfaces of such radii of curvature as to produce a directly viewable image, throughout a wide angle of view and a motor for driving both drums in synchronism with the received signal, said reflecting surfaces having their major axes parallel to the rotational axes of their respective supporting drums.

6. Means for reproducing television pictures comprising a source of light reflecting means for focusing a bundle of rays from said source into a linear image, first rotating means for moving said image in a direction perpendicular to its length, separate reflecting means for focusing said bundle of rays into a second linear image perpendicular to said first image, and second rotating means for moving said second image in a direction perpendicular to its length said first and said second rotating means revolving about mutually perpendicular axes.

7. In a television reproducer, a source of light, a plurality of discrete reflecting elements for producing in space two virtually intersecting and mutually perpendicular linear images of said source and means for moving the point of said virtual intersection so as to scan an optical image, said reflecting elements being substantially at right angles to one another when optically cooperating.

8. In a television reproducer, a source of light, means for producing in space two virtually intersecting and mutually perpendicular linear true optical images of said source, said linear images being at materially different optical distances from said source, and means for moving the point of said virtual intersection, whereby image scanning is effected.

9. A television scanning element including a rotatable cylindrical drum, a plurality of concave mirrors upon the periphery of said drum having their major axes equidistant from the axis of said drum and parallel thereto and means for rotating said drum so as to scan in one dimension only and form a directly viewable image each of said mirrors being sufficiently long to embrace both dimensions of a complete optical image.

HAROLD P. DONLE.